UNITED STATES PATENT OFFICE.

BENJAMIN E. LORENTZ, OF FORT WAYNE, INDIANA, ASSIGNOR, BY MESNE ASSIGNMENTS, TO R. T. VANDERBILT COMPANY, OF NEW YORK, N. Y., A CORPORATION OF NEW YORK.

ACCELERATOR IN VULCANIZING RUBBER COMPOUNDS.

1,413,172.  Specification of Letters Patent. Patented Apr. 18, 1922.

No Drawing.  Application filed March 30, 1920. Serial No. 369,883.

*To all whom it may concern:*

Be it known that I, BENJAMIN E. LORENTZ, a citizen of the United States, residing at Fort Wayne, county of Allen, State of Indiana, have invented certain new and useful Improvements in Accelerators in Vulcanizing Rubber Compounds, of which the following is a full, clear, concise, and exact description.

The object of my invention is to improve the vulcanization of rubber compounds by the addition thereto of certain organic substances which through their catalytic or other action greatly reduce the time required for vulcanization while at the same time improved results are accomplished with the addition of smaller quantities of the accelerator or catalyzer than has heretofore been possible.

Up to the present time it has been considered that organic compounds must be strongly basic in character, such as amines and ammonias, in order to constitute effective catalytic agents in the vulcanization of rubber, and many such compounds have been advocated, especially those which have a dissociation constant greater than $\frac{1}{10^8}$. This dissociation point has distinguished the strong bases, such as aliphatic amines, from weak bases, such as aniline oil and similar aromatic substances.

I have discovered, however, that compounds known as tetra-substituted thiuramdisulphides, in which the substituting groups may be radicals of either the aliphatic or aromatic series or both together are accelerators of particular effectiveness. These are produced by the oxidization of salts of alkylated dithio-carbamic acids by iodine, bromine, hydrogen peroxide or potassium persulphate, according to the formula:

$$2R'.NH.CS.SH.NH_2R'' + I_2 = S_2(CS.NHR')_2 + 2NH_2R''.HI.$$

The substances, particularly the tetra-substituted compounds of which tetramethyl thiuramdisulphide is an example, are capable of being heated to a relatively high degree without decomposition. They are not basic in character and are decomposed neither by the action of dilute acids nor alkalies, and do not combine with them. They are insoluble in water and have a definite crystalline form and definite melting points. They are essentially different in character and properties from the condensation products of dimethyline with carbon disulphide, known as dimethylammoniumdimethyldithiocarbamate, which has been used to some extent as an accelerator.

In general my improved catalyzers are prepared by condensing an amine, preferably secondary amines, such as monomethylaniline, dimethylamine, etc., with carbon disulphide in aqueous or alcoholic solutions and then oxidizing the resulting product with any suitable oxidizing agent of which iodine, bromine, hydrogen dioxide, are examples. The resulting compound has the structure as indicated by $R_2N.CS.S.S.CS.NR_2$ or

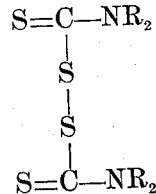

When the radical R is substituted by $CH_3$ the latter becomes

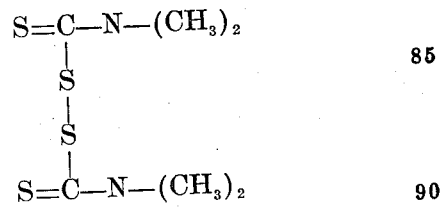

which is tetramethyl thiuramdisulphide, represented by the symbols $C_6H_{12}N_2S_4$.

As an example of the use of this substance in the compounding and vulcanization of rubber the following formula is given:

Crude rubber _____ 100 lbs.
Zinc oxide _____ 50 lbs.
Sulphur _____ 4 lbs.
Tetramethyl thiuramdisulphide ___ 2 oz.

Curing in the mold is continued for fifteen minutes at 280° F.

The very small quantity of the accelerator that is necessary and the reduced amount of sulphur made possible, together with the short time required in vulcanization, makes my improved accelerator particularly economical and effective in rubber manufactures and at the same time improves the quality of the product.

Furthermore, by using proper proportions of my improved accelerator and sulphur, excess of free sulphur may be eliminated in the finished product, thus avoiding sulphur "bloom" and other disadvantageous effects, such as hardening with age.

I do not wish to be understood as being limited to the specific proportions as indicated by the above formula or to any fixed proportion of ingredients for various proportions and other ingredients may be used with my improved accelerator, as will be understood by those skilled in the art, without departing from the spirit and scope of my invention.

What I claim and desire to protect by Letters Patent is:

1. A vulcanized rubber compound containing before vulcanization a vulcanizing agent and a tetra-alkylated thiuramdisulphide, in which the substituting groups are hydrocarbon radicals.

2. A vulcanized rubber compound containing before vulcanization a vulcanizing agent and tetra-alkylated thiuramdisulphide.

3. A vulcanized rubber compound containing before vulcanization a vulcanizing agent and tetramethyl thiuramdisulphide.

4. An accelerator as an ingredient in the process of vulcanizing comprising a tetra-alkylated thiuramdisulphide in which the substituting groups are hydrocarbon radicals.

5. An accelerator as an ingredient in the process of vulcanizing comprising a tetra-alkylated thiuramdisulphide.

6. An accelerator as an ingredient in the process of vulcanizing, comprising tetramethyl thiuramdisulphide.

7. The process of making rubber articles which comprises mixing with raw or crude rubber, a vulcanizing agent, and an accelerator comprising a tetra-alkylated thiuramdisulphide, in which the substituting groups are hydrocarbon radicals, and heating the resulting compound to vulcanize the same.

8. The process of making rubber articles which comprises, mixing with raw or crude rubber, a vulcanizing agent and an accelerator comprising a tetra-alkylated thiuramdisulphide, and heating the resulting compound to vulcanize the same.

9. The process of making rubber articles which comprises, mixing with raw or crude rubber, a vulcanizing agent and an accelerator consisting of tetramethyl thiuramdisulphide, and heating the resulting compound to vulcanize the same.

10. The process for vulcanizing rubber comprising combining therewith a vulcanizing agent and an alkylated thiuramdisulphide, and vulcanizing the rubber.

11. A vulcanized rubber derived from rubber combined with a vulcanizing agent and an alkylated thiuramdisulphide.

BENJAMIN E. LORENTZ.